(12) United States Patent
Stoiber et al.

(10) Patent No.: US 7,708,549 B2
(45) Date of Patent: May 4, 2010

(54) BLOW MOLDING MACHINE

(75) Inventors: Christian Stoiber, Michelsneukirchen (DE); Klaus Voth, Obertraubling-piesenkofen (DE)

(73) Assignee: Krones AG, Neutraubling (DE)

( * ) Notice: Subject to any disclaimer, the term of this patent is extended or adjusted under 35 U.S.C. 154(b) by 275 days.

(21) Appl. No.: 11/791,463

(22) PCT Filed: Nov. 24, 2005

(86) PCT No.: PCT/EP2005/012565

§ 371 (c)(1),
(2), (4) Date: Oct. 31, 2007

(87) PCT Pub. No.: WO2006/056437

PCT Pub. Date: Jun. 1, 2006

(65) Prior Publication Data

US 2008/0113061 A1    May 15, 2008

(30) Foreign Application Priority Data

Nov. 26, 2004  (DE) .................. 10 2004 057 102

(51) Int. Cl.
  *B29C 49/36* (2006.01)
  *B29C 49/56* (2006.01)
  *B29C 31/08* (2006.01)
(52) U.S. Cl. .................. 425/534; 425/540; 425/541
(58) Field of Classification Search .................. 425/534, 425/540, 541
  See application file for complete search history.

(56) References Cited

U.S. PATENT DOCUMENTS

| | | | |
|---|---|---|---|
| 2,285,150 A | 6/1942 | Ferngren | |
| 2,331,687 A * | 10/1943 | Hobson | 264/536 |
| 2,750,625 A * | 6/1956 | Colombo | 425/536 |
| 2,901,769 A | 9/1959 | Sherman et al. | |
| 3,005,235 A | 10/1961 | Patera | |
| 3,415,915 A | 12/1968 | Lecluyse et al. | |
| 3,611,484 A * | 10/1971 | Lecluyse et al. | 425/526 |
| 3,624,672 A | 11/1971 | Spivy | |
| 3,969,059 A | 7/1976 | Michel | |
| 4,233,010 A * | 11/1980 | Suzuki | 425/143 |
| 4,313,720 A | 2/1982 | Spurr | |
| 4,565,516 A | 1/1986 | Szajna et al. | |
| 6,390,802 B1 | 5/2002 | Zoppas | |
| 6,824,731 B1 * | 11/2004 | Zoppas | 264/523 |

FOREIGN PATENT DOCUMENTS

| | | |
|---|---|---|
| CN | 1302251 | 7/2001 |
| DE | 938 878 | 3/1956 |
| DE | 18 09 033 B2 | 7/1969 |
| DE | 297 16 268 U1 | 10/1998 |
| DE | 29716268 U1 | 11/1998 |
| DE | 198 10 238 A1 | 5/1999 |
| DE | 199 06 366 A1 | 8/2000 |
| DE | 100 05 687 A1 | 8/2001 |
| DE | 100 63 795 A1 | 6/2002 |
| DE | 20 2004 017 530 U1 | 4/2005 |
| EP | 0 284 242 A2 | 9/1988 |
| EP | 1 084 020 B1 | 3/2001 |
| GB | 1171890 | 11/1969 |
| JP | 61-086235 | 5/1986 |

* cited by examiner

*Primary Examiner*—Robert B Davis
(74) *Attorney, Agent, or Firm*—Marshall, Gerstein & Borun LLP

(57) ABSTRACT

A blow molding machine having a revolving blow mold holder and at least one blow mold held thereon, having at least two blow mold parts, whereby to open the blow mold at least one of the blow mold parts is stationary in comparison with the position of a finished blow molded article and the other blow mold part can be moved in a lateral movement.

10 Claims, 3 Drawing Sheets

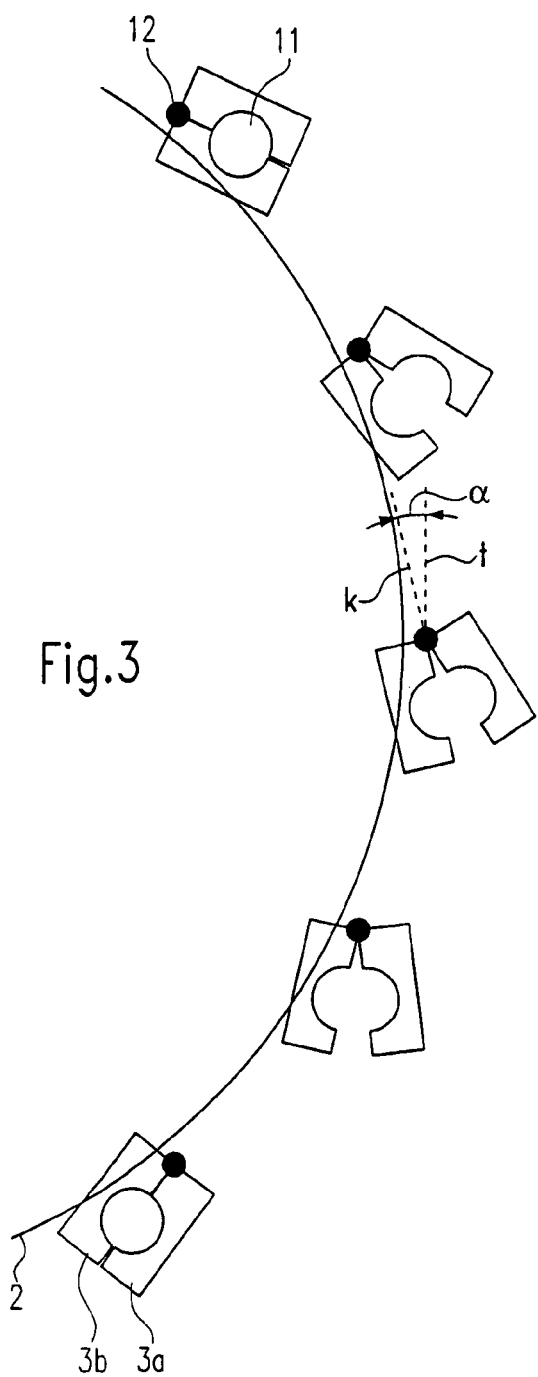
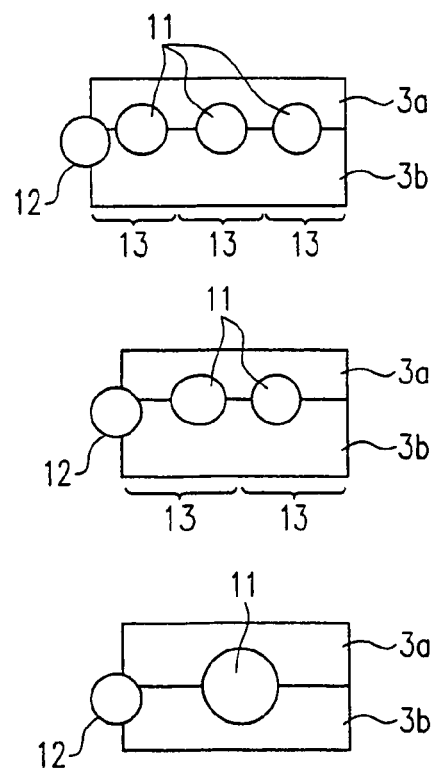
Fig.3
Fig.4

BLOW MOLDING MACHINE

CROSS-REFERENCE TO RELATED APPLICATION

This is the U.S. national stage under 35 U.S.C. §371, of international application no. PCT/EP2005/012565, having an international filing date of Nov. 24, 2005, and claims priority to German application no. 10 2004 057 102.3 filed on Nov. 26, 2004.

FIELD OF THE DISCLOSURE

The disclosure relates to a blow molding machine with which articles blow molded by a blow molding method can be produced.

BACKGROUND OF THE DISCLOSURE

EP 1 084 020 B1 describes a device for manufacturing containers of plastic material in which two opposing parts of a blow mold are pivoted in relation to one another to open the mold in such a way that an outer part of the blow mold is pivoted downward about a horizontal pivot axis. However, this embodiment has the disadvantage that a great deal of space is required to pivot the one blow mold part out of a vertical position into a horizontal position.

U.S. Pat. No. 3,415,915 describes a machine having a similar design with the same disadvantages.

U.S. Pat. No. 2,901,769 describes a device for manufacturing plastic articles, in which two opposing blow mold parts may be pivoted about a common pivot axis, with the two parts being pivoted in opposite directions to open the mold.

One disadvantage of such devices may be that inaccuracies in the manufactured articles may occur due to the mobility of the two blow mold parts.

SUMMARY OF THE DISCLOSURE

The object of the present disclosure is therefore to make available a blow molding machine that is as compact as possible and operates with the greatest possible precision.

To obtain the simplest possible mechanism and be able to manufacture the most accurate articles possible, a blow mold part is stationary in the blow mold in comparison with the position of a finished blow molded article.

The position of a finished blow molded article in the blow mold is predetermined, for example, by a compressed air valve outlet, a stretching rod, a holder or the like, which are used in the blow molding operation.

Due to the fact that this blow mold part does not move in comparison with the position of the finished blow molded article, there are no inaccuracies due to the relative mobility of this blow mold part. Due to the movement of the other blow mold part in a lateral movement, much less space is needed in comparison with a movement downward. This movement may possibly also include a component upward or downward because a more compact design is possible already due to the movement with a lateral component. Movement only in the lateral direction is preferred.

The two blow mold parts may advantageously be opposing blow mold parts, which means that with the blow mold closed, they are on opposite sides of the position of a finished blow molded article.

The blow mold is advantageously arranged on the whole so that one blow mold part revolves farther inward than the other blow mold part. Since some space is needed to open the blow mold, such an arrangement makes it possible to achieve the result that the opening includes at least a significant component of movement in a radial direction, so that the blow molds can be arranged as close together as possible in the tangential direction. Only relatively little space is needed between any other blow molds that might be present in order to open the blow mold.

The blow mold part that can be moved away laterally is advantageously pivotably mounted on the blow mold holder and preferably has a pivot axis that is vertical. This yields a movement with an exclusively lateral component.

The blow mold part that can be moved away is advantageously moved forward in the direction of rotation of the blow mold holder when opening the blow mold. Therefore, parisons and finished blow mold articles can be inserted into the blow mold and extracted from it at the rear as seen in the direction of revolution.

In addition, it may be provided that the two blow mold parts can be pivoted together in the same direction.

The blow mold is advantageously arranged on the whole so that one blow mold part revolves farther inward than the other. Some space is still needed to open the blow mold, so with such an arrangement it is possible to achieve the result that the opening includes at least a significant component of movement in a radial direction so that the blow molds can be arranged as close together as possible tangentially. For the opening of the blow mold, only a relatively small amount of space is needed between multiple blow molds that might be present.

The blow mold part that can be moved away laterally is advantageously pivotably mounted on the blow mold holder and preferably has a pivot axis that is horizontal. This yields a movement with an exclusively lateral component.

Advantageously the blow mold part that can be moved away is moved forward when opening the blow mold in the direction of revolution of the blow mold holder. Therefore, parisons and finished blow molded articles can be introduced into the blow mold from the rear and extracted from it from the rear as seen in the direction of revolution.

In addition, it is possible to provide for the two blow mold parts to be pivotable together in the same direction.

Due to the joint pivoting of the two blow mold parts in the same direction, it may be possible to simplify the insertion of the parison or the removal of the finished blow molded articles because a better alignment of the blow mold with respect to the corresponding transfer means for the parisons or the finished blow molded articles is possible.

However it is also possible that the blow mold part which is stationary in comparison with the position of a finished blow molded article may be held immovably on the blow mold holder. This yields an especially simple design.

The two blow mold parts have contact surfaces with which they come in contact with one another to form the cavity of the blow mold. These contact surfaces are advantageously arranged tangentially with respect to the circumference of the blow mold holder. Therefore, one half-mold with its half-cavity faces directly outward, so that access here is readily possible.

However, under certain conditions, it may also be advantageous to align the contact surface at a clearance angle with respect to the tangent. Therefore this may provide some relief in the design for the transfer of the parisons and the finished blow molded articles.

In addition, it is advantageous to provide a blow mold whose blow mold parts have multiple sections for multiple blow mold articles. This allows an increase in capacity. This is readily possible in particular in the case of a blow mold with which multiple blow mold articles are arranged side by side, as seen in the radial direction because these can then be removed more easily and more rapidly.

In addition, transfer star mechanisms for transferring the parisons and receiving the finished blow molded articles are advantageous also provided. These transfer star mechanisms must be designed in such a way that they allow movement tangentially in relation to the blow mold. Thus, for example, the parison may be inserted from the rear into the blow mold, which is opened at the rear, and the finished blow molded article may be removed at the rear accordingly.

The blow molding machine is preferably designed for manufacturing containers such as bottles, in particular plastic bottles, preferably PET bottles.

BRIEF DESCRIPTION OF THE DRAWINGS

Embodiments of the present disclosure will now be explained in greater detail on the basis of the accompanying figures, in which

FIG. 3 shows a schematic view of another blow molding machine from above;

FIG. 4 shows a schematic view of various blow mold parts.

DETAILED DESCRIPTION OF THE DISCLOSURE

Figure 1:
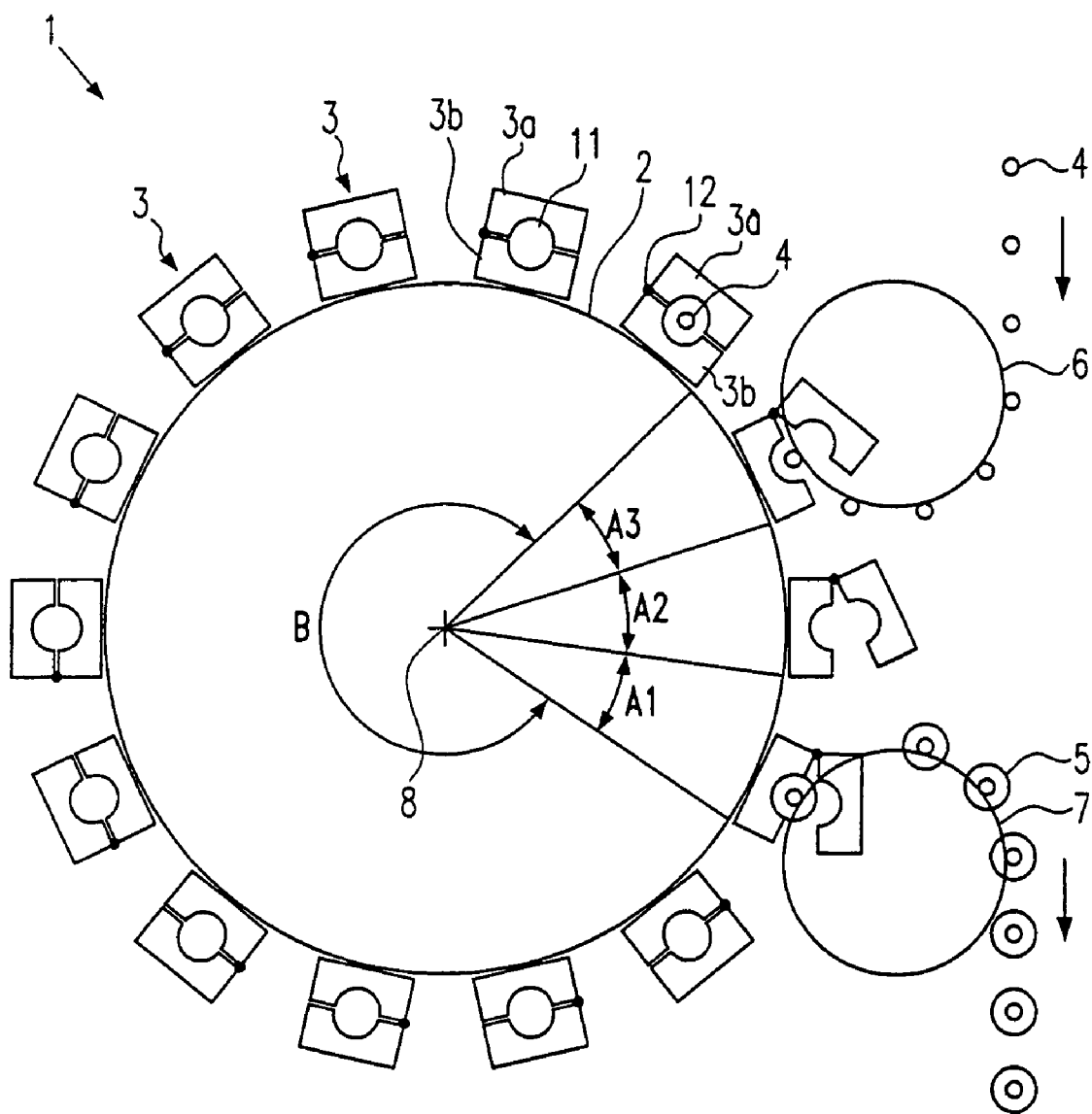
FIG. 1 shows a schematic view of a blow molding machine from above.

FIG. 1 shows a blow molding machine 1 in a schematic view from above. Blow molds 3 are arranged on a rotor 2. One blow mold 3 comprises two blow mold halves 3a and 3b, among other parts. The blow mold halves 3a, 3b have recesses which form a cavity 11 when the blow mold is closed. A third part that closes the bottom of the cavity may be provided at the lower end of the blow mold parts 3a, 3b. However, this part is optional because the bottom may also be formed by the blow mold halves 3a, 3b. Multiple blow molds 3 are arranged on the rotor 2 along the circumference of the rotor. The rotor 2 in FIG. 1 is designed to revolve counterclockwise. The blow mold part 3b is arranged on the rotor 2 in a fixed relationship to the rotor 2. However, the blow mold part 3a is mounted to pivot about a pivot axis 12. By pivoting the blow mold part 3a about the pivot axis 12, the blow mold part 3a is moved away in a lateral movement. In the revolution of a blow mold 3 on the rotor 2, the blow mold passes through various states.

The blow mold 3 is closed in the clearance angle range labeled as B. In this range a parison is converted into a finished blow molded article by blow molding.

The blow mold is opened in the range A1 through A3. In the range A3, a parison 4 is introduced into the blow mold 3. In the range A1 a finished blow molded article 5 is removed from the blow mold 3. In the range A2 the blow mold 3 is opened and is empty and is moved from range A1 to range A3.

A transfer star mechanism 6 is provided to insert a parison 4 into the blow mold 3. Likewise, a transfer star mechanism 7 is provided for removing finished blow molded articles 5 from the opened blow mold 3.

Figure 2:
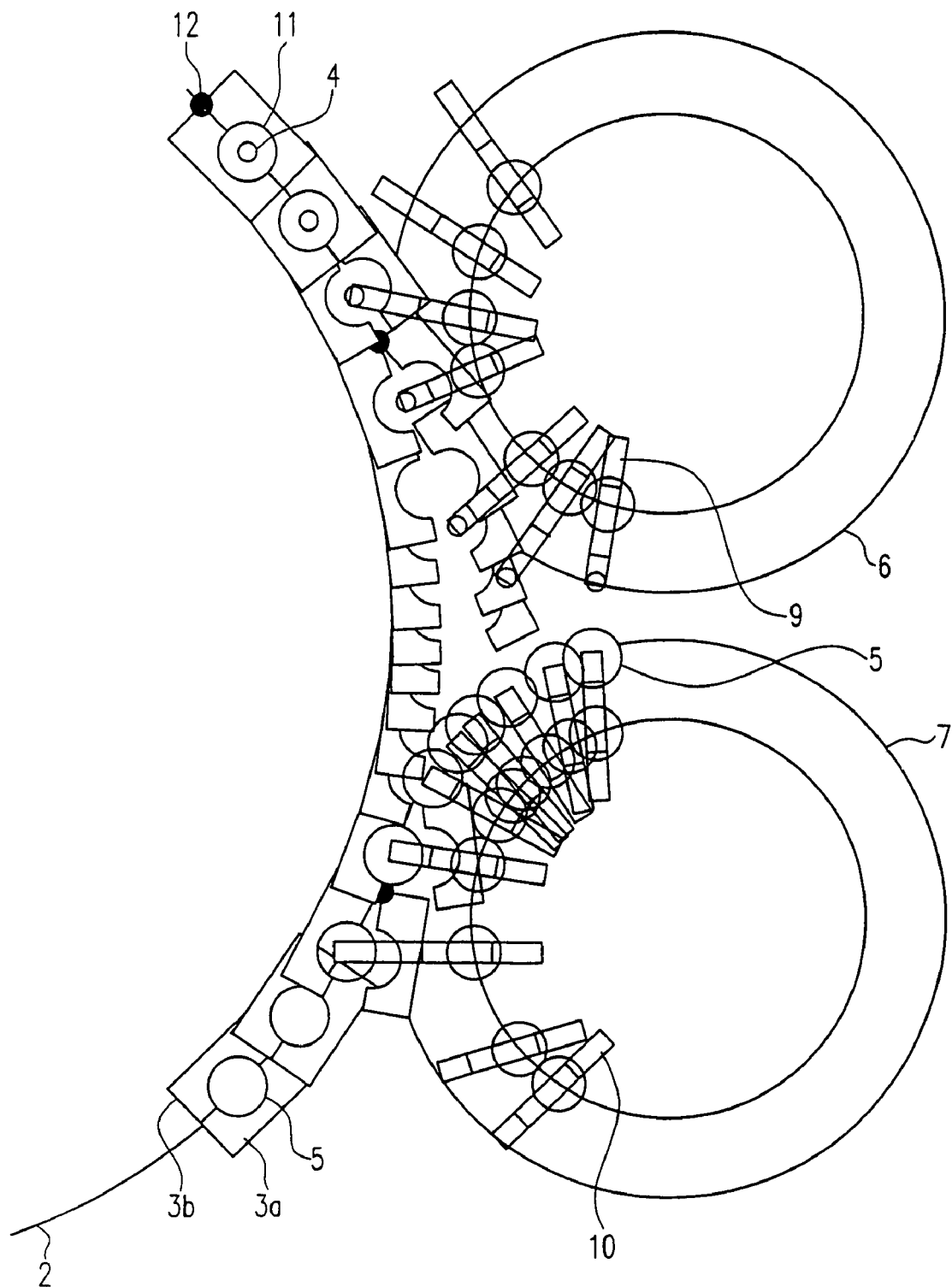
FIG. 2 shows a schematic view of the blow molding machine from above in various operating states.

FIG. 2 shows an enlarged detail from FIG. 1. Various states of a blow mold 3 in various open states are shown in FIG. 2 The states illustrated here do not occur simultaneously in time. A finished blow molded article 5 is shown in the blow mold 3 at the very bottom of FIG. 2 and the blow mold 3 is closed. The two blow mold parts 3a, 3b are situated one on top of the other.

The blow mold part 3a is pivoted to the right in the area of the transfer star mechanism 7. An arm with a transfer star mechanism 7 that is rotatably and linearly displaceable grips the article 5. The article 5 is moved somewhat radially out of the blow mold half 3b and then is delayed by a corresponding pivoting movement of the arm 10, so that as the blow mold 3 moves further, the article 5 is moved out of the blow mold 3 toward the rear. After the blow mold 3 has left the area of the transfer star mechanism 7, the article 5 may be moved further away from the rotor 2 by the transfer star mechanism 7.

A parison 4 is inserted into the empty blow mold 3 which is in the opened position by means of an arm 9 via the transfer star mechanism 6. The parison 4 is inserted here from the rear into the blow mold 3 as it passes by. To do so, the parison 4 must have a relative speed with respect to the blow mold 3 including a tangential component with respect to the movement of the rotor 2 so that the parison 4 to be inserted from the rear will reach the center of the blow mold 3. In this position the blow mold 3 is closed. The parison may then be held by the blow mold or by some other holder of the rotor 2.

The arm 9 is designed to be rotatable and linearly displaceable. The movement of the arms 9 and 10 is controlled by a corresponding control cams which predetermine the rotation as well as the displacement.

FIG. 2 shows an embodiment of the blow molding machine 1 in which the contact surface between the blow mold part 3a and the blow mold part 3b is arranged tangentially to the rotor circumference. This means that the two positions of the blow mold parts 3a and 3b which come in contact at the side of the cavity 11 are revolving on the same line.

FIG. 3 shows another embodiment of a blow molding machine in which the contact surfaces are arranged at a clearance angle $\alpha$ to the tangential. The blow mold part 3b is rotated by a few degrees about a vertical axis in comparison with the embodiment in FIG. 1 or 2.

The opening and closing of the blow mold 3 into which parisons can be inserted and from which articles can be removed are shown schematically in FIG. 3, from the bottom to the top of the figure.

A tangential direction is labeled as t and the alignment of the contact faces is labeled as k. The clearance angle $\alpha$ is formed between the lines t and k.

In FIGS. 1 through 3, the blow mold half 3b is provided in a fixed relationship to the rotor 2, but it may also be possible to swivel the entire blow mold 3. In doing so both blow mold parts 3a, 3b are swiveled jointly in the same direction of rotation. This may be advantageous for the insertion of parisons and the removal of finished blow molded articles 5, for example.

FIG. 4 shows various embodiment of the blow mold parts 3a, 3b. At the bottom of FIG. 4 is shown the version which is also shown in FIGS. 1 through 3. The pivot axis 12 is provided slightly below the middle of the blow mold 3 in FIG. 4. It may also be situated at or above the middle.

At the bottom of FIG. 4, only one cavity 11 is provided for a finished blow molded article. With the two other embodiments shown in FIG. 4, two or three cavities 11 are provided, each being arranged in sections 13.

With such blow mold halves 3a, 3b, it is possible to shape several articles simultaneously. Due to the fact that the cavities 11 are arranged side by side as seen in the radial direction of the rotor 2, the articles 5 and the parisons 4 can easily be removed and inserted side by side either simultaneously or in succession.

We claim:

1. Blow molding machine comprising a revolving blow mold holder, at least one blow mold which is held thereon and which comprises at least two blow mold parts, whereby in opening the blow mold at least one of the blow mold parts is stationary in comparison with the position of a finished blow molded article and at least one other blow mold part can be moved away in a lateral movement, wherein the blow mold part that can be moved away laterally is held pivotably on the blow mold holder, with a pivot axis which is arranged vertically, wherein one blow mold part moves farther to the inside than the other blow mold part, and wherein parisons or articles can be inserted from the rear into the blow mold as seen in the direction of revolution of the rotor.

2. Blow molding machine according to claim 1, wherein the two blow mold part are opposing blow mold parts.

3. Blow molding machine according to claim 1, wherein the laterally movable blow mold part can be moved forward in the direction of revolution of the blow mold holder.

4. Blow molding machine according to claim 1, wherein both blow mold parts can be pivoted together in the same direction.

5. Blow molding machine according to claim 1, wherein the stationary blow mold part, which does not move in relation to the position of a finished blow molded article, is held immovably on the blow mold holder.

6. Blow molding machine according to claim 1, wherein a contact face of the blow mold part that is stationary in comparison with the position of a finished blow molded article is arranged tangentially.

7. Blow molding machine according to claim 1, wherein a contact face of the blow mold part that is stationary in comparison with the position of a finished blow molded article is arranged at a clearance angle ($\alpha$) to the tangential to the direction of revolution.

8. Blow molding machine according to claim 1, wherein the blow mold parts have sections for several blow mold articles.

9. Blow molding machine according to claim 1, wherein a transfer star mechanism is provided and may insert one or more parisons into a blow mold, whereby these parisons can be inserted into the blow mold at a relative speed in relation to the blow mold in a tangential direction to the revolving blow mold holder.

10. Blow molding machine according to claim 1, wherein a transfer star mechanism is provided which can transfer one or more blow molded articles out of a blow mold, whereby these articles can be removed from the blow mold at a relative speed in relation to the blow mold in the tangential direction of the revolving blow mold holder.

* * * * *